(12) United States Patent
Wentz et al.

(10) Patent No.: US 6,553,429 B1
(45) Date of Patent: Apr. 22, 2003

(54) FAST CONDITIONAL THUNK UTILITY

(75) Inventors: Brian D. Wentz, Seattle, WA (US); James Edward Walsh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/092,257

(22) Filed: Jun. 5, 1998

(51) Int. Cl.[7] ............................................. G06F 9/46
(52) U.S. Cl. ...................... 709/330; 717/138; 717/170
(58) Field of Search ................................ 709/100, 330; 717/138, 170

(56) References Cited

U.S. PATENT DOCUMENTS 5,491,808 A * 2/1996 Geist, Jr.
5,734,904 A * 3/1998 Kanamori et al. .......... 709/305

* cited by examiner

Primary Examiner—Zarni Maung
Assistant Examiner—George L. Opie
(74) Attorney, Agent, or Firm—Merchant & Gould; Alton Hornsby, III

(57) ABSTRACT

A conditional thunk utility employing an assembler-level direct-branch thunk technique. In a condition-check alternative, the conditional thunk utility performs a condition check followed by a direct-branch jump. The condition-check methodology is implemented using an assembler-level direct-branch technique, and the conditional thunk utility does not utilize the stack to queue the arguments of a function call. Thus, the stack is not altered from its desired condition just prior to executing the API function call. The condition-check alternative checks the thunk condition for each function call and, for this reason, may be used when the thunk condition can vary relatively frequently while the host computer system is running. In a jump-table alternative, the conditional thunk utility performs an assembler-level jump table check followed by a direct jump to a target address. In the jump-table alternative, the assembler-level direct branch code is configured to retrieve the jump address for the conditional thunk decision from the instruction cache memory (I-cache). Because the thunk conditions are checked and the jump table is configured in advance, the jump-table embodiment does not require a thunk condition check before each jump. For this reason, the jump-table alternative may be used for thunk conditions are invariant, or vary relatively infrequently, while the host computer system is running.

11 Claims, 4 Drawing Sheets

FAST CONDITIONAL THUNK UTILITY

TECHNICAL FIELD

This invention relates generally to the field of computer software and, more particularly, to a fast conditional thunk utility employing an assembler-level direct-branch thunk technique.

BACKGROUND OF THE INVENTION

A conditional thunk layer is a software operation that assists in an associated function call, typically by making a decision that affects the function call. In general, a conditional thunk layer immediately precedes its associated function call and makes a decision based on the status of a condition. The result of this decision affects the associated function call, typically by determining which version of the function to call.

For example, a software system may include more than one function that may be called to produce a desired result. In this case, the thunk layer is a precursor operation that determines which function to call. In another example, the software system includes a function that may be called with more than one set of arguments to produce a desired result. In this case, the thunk layer is a precursor operation that determines which arguments to include in the function call.

A first conventional approach implemented in the OFFICE 97 suite of programs, distributed by MICROSOFT Corporation, performs conditional thunk decisions through a "C-level" conditional thunk function. This type of thunk layer is referred to as a "thunk function" to indicate that the thunk decision is implemented through a "C-level" function call. Because the thunk function immediately precedes its associated application program interface (API) function call, this approach results in a duplication of function calls.

Moreover, the added thunk function call alters the parameter passing utility, such as the stack, from the precise condition desired for the ensuing API function call. For this reason, the parameter passing utility must be returned to the condition desired for the API function call after the thunk function call. For a non-thunked function call requiring "X" instructions, this duplication of stack conditioning burdens the processor with "2X+2" instructions for a conditionally-thunked version of the function call. The OFFICE 97 solution checks the thunk condition for each API function called and, thus, is useful in circumstances in which the thunk condition can vary relatively frequently while the client program is running.

A second conventional approach implemented in the ACCESS 97 program, also distributed by MICROSOFT Corporation, performs conditional thunk decisions by loading a look-up table with a pointer to a memory address for each conditionally-thunked API function call. Each entry in the table points to the appropriate thunk code for the function call. That is, the thunk conditions are checked at start up or when the ACCESS 97 program is loaded, and the look-up table is populated with the appropriate pointers for the API function calls. The look-up table may be subsequently refreshed as needed to account for changes in the thunk conditions. Thus, the ACCESS 97 solution is typically used in circumstances in which the thunk conditions can be expected to change less frequently than the look-up table will be referenced. For example, the ACCESS 97 is particularly advantageous when the thunk conditions are invariant, or vary relatively infrequently, while the client program is running.

Because the look-up table is populated with pointers to API functions, this type of branch is referred to as an "unconditional indirect" branch. The branch is "unconditional" because the look-up table contains only one possible target location for the jump. Thus, a condition does not have to be checked to select among alternative target locations for the jump at the time the branch is encountered. The branch is "indirect," however, because the look-up table must be referenced to determine the target location for the jump. In other words, a pointer must be "indirected" or "de-referenced" to determine the branch target.

The ACCESS 97 approach encounters drawbacks because typical processors, such as the INTEL PENTIUM PRO processor and related models, handle certain indirect branches inefficiently. More specifically, the processor cannot always determine where the branch will lead (i.e., the instruction at the target address of the indirect branch) until it reads the entry in the look-up table, which must be loaded from memory. This is because the processor utilizes a Branch Target Buffer (BTB) that includes only 512 entries. Although the processor may reference the BTB to correctly predict the target address for an encountered branch, the BTB only stores the target addresses for the most recent 512 branches encountered. The processor has no mechanism to correctly predict the target address for an indirect unconditional branch that is not among the most recent 512 branches encountered.

For relatively large program modules, such as MICROSOFT OFFICE, branches not reflected in the BTB may be encountered frequently. For these branches, the look-up table must be reference to determine the correct target address for the branch. While the entry is being read, the processor typically pre-processes future instructions using a prediction of the next instruction. As it turns out, this prediction is almost always wrong for branches that are not reflected in the BTB. This is because the next instruction will be located at the address from the look-up table, which has not yet been read. The processor's pre-processing algorithm, on the other hand, usually predicts the next instruction to be the instruction immediately following the indirect branch instruction. This prediction is almost always incorrect because, if this was not the case, the look-up operation to determine the target address of the indirect branch would not have been necessary in the first place. The time elapsed until the successful execution of the instruction at the target location following an incorrect prediction leading to performing unwanted instructions is sometimes referred to as a "processor stall."

Thus, there is a need for a conditional thunk methodology that avoids duplicative stack manipulation, such as that produced by using a "C-level" function call to implement a conditional thunk routine. There is a further need in the art for a conditional thunk methodology that avoids an indirect branch, such as a reference to an address in a look-up table stored in system memory, to determine the target address of a conditional thunk routine.

SUMMARY OF THE INVENTION

The present invention meets the needs described above in a fast conditional thunk utility. The improved conditional thunk layer is referred to as a "utility" to indicate that, unlike certain previous conditional thunk layers, it is not implemented using a "C-level" function call. Nor is the conditional thunk layer implemented using a look-up table stored in system memory. Instead, the invention implements a conditional thunk utility through an assembler-level direct-branch technique.

The fast conditional thunk utility is typically employed when a client program, such as an application program, accesses an application program interface (API) exposed by a host program, such as the operating system. The primary advantage of the invention is a significant improvement in the processing speed or performance of the conditional thunk decision. Another advantage is a significant reduction in the size of the code required to implement the conditional thunk layer, which reduces the memory requirement of the client program.

In a first configuration, referred to as a "condition-check" alternative, the conditional thunk utility performs a condition check followed by a direct-branch jump. Because the condition-check methodology is implemented using an assembler-level direct-branch technique, the conditional thunk utility does not utilize the parameter passing utility, typically the stack, to queue the arguments of a function call. Thus, the stack is not altered from its desired condition just prior to executing the API function call. The condition-check alternative checks the thunk condition for each function call and, for this reason, may be used when the thunk condition can vary relatively frequently while the host computer system is running.

In a second configuration, referred to as a "jump-table" alternative, the conditional thunk utility performs an assembler-level jump table check followed by a direct jump to a target address. The jump-table alternative retrieves the target address for the conditional thunk decision from the instruction cache (I-cache). As a result, this approach avoids incorrect prediction of pre-processing instructions executed while a jump address is retrieved from system memory, which caused processor stalls in previous conditional thunk layers. Because the thunk conditions are checked and the jump table is configured in advance, the jump-table alternative does not require a thunk condition check before each jump. For this reason, the jump-table alternative may be used for thunk conditions that are invariant, or vary relatively infrequently, while the client program is running Generally described, the invention is a method for processing a function call in which a client program generates a function call associated with a conditionally thunked function to a host program. In connection with the function call, the client program pushes parameters onto a parameter passing utility. Without altering the condition of the parameter passing utility, the client program invokes an assembler-level direct-branch conditional thunk utility that selects a version of the function based on a condition of a host computer system. The client program then calls the selected version of the function. The host program reads the parameters from the parameter passing utility and performs the selected version of the function using the parameters read from the parameter passing utility.

According to an aspect of the invention, the conditional thunk utility selects a version of the function by checking a thunk condition. If the thunk condition is satisfied, the conditional thunk utility jumps to an address corresponding to a thunked version of the function. Alternatively, if the thunk condition is not satisfied, the conditional thunk utility jumps to an address corresponding to a non-thunked version of the function.

According to another aspect of the invention, before the client program receives a conditionally thunked function call, it checks a plurality of thunk conditions to obtain a thunk condition result for a number of functions. The client program then loads an assembler-level jump table with a target address for each function. In this jump table, the value of the target address associated with a particular function depends on the thunk condition result for that function. Upon invocation by the client program, the conditional thunk utility jumps to a previously-selected version of a called function by obtaining a target address associated with the function from the jump table located in an instruction cache memory. The conditional thunk utility then jumps to that target address.

In addition, checking a thunk condition may include determining whether the host computer system includes a predefined type of processor. Alternatively, checking a thunk condition may include determining whether the host computer system includes a predefined type of operating system. Or checking a thunk condition may include determining the status of a dynamic parameter of the host computer system, such as the status of the dynamic parameter that indicates whether a predefined dynamic link library (DLL) is resident in a random access memory component of the host computer system. In general, the thunk decision may be based on a wide variety of conditions, such as the type of printer installed, the settings of a printer or display driver, the type or state of a particular object, the state of user-defined program settings, whether certain program modules are installed or loaded in system memory, the keyboard language being used, and so forth.

That the invention improves over the drawbacks of prior conditional thunk layers and how it accomplishes the advantages described above will become apparent from the following detailed description of the exemplary embodiments and the appended drawings and claims.

DETAILED DESCRIPTION OF EXEMPLARY EMBODIMENTS

Figure 1:
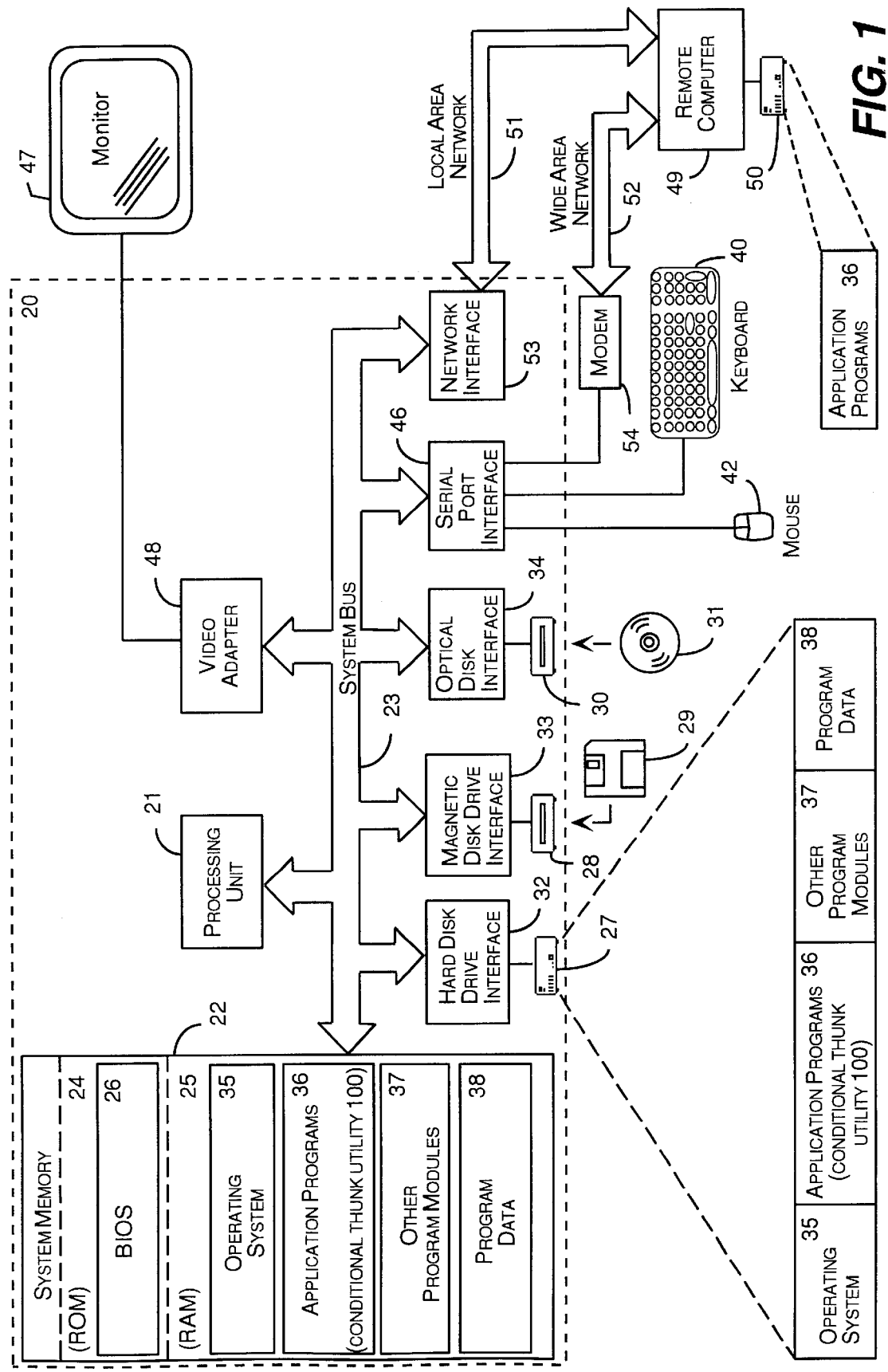
FIG. 1 is a functional block diagram of a personal computer system that provides the operating environment for the exemplary embodiments of the invention, which are shown in FIGS. 2A, 2B, 3 and 4.

The invention may be implemented as a conditional thunk utility that improves over prior art conditional thunk routines by replacing the "C-level" function call or look-up table employed in prior conditional thunk routines with an assembler-level direct-branch technique. The conditional thunk utility is typically configured as part of a client program, such as an application program, and is employed when the client program accesses the application program interfaces (APIs) exposed by a host program, such as an operating system.

The conditional thunk utility typically assists the application program in making function calls to access the APIs exposed by the operating system, which allows the application program to invoke the functionality provided by the operating system. For example, the operating system APIs may be accessed to display data on a display device, retrieve data from a memory device, send data to an output device, queue instructions for execution, and so forth.

In a condition-check embodiment, the assembler-level direct branch condition-check involves a condition check followed by a direct-branch jump. This condition-check embodiment checks the thunk condition for each function call and, for this reason, is preferred when the thunk condition can vary relatively frequently while the host computer system is running. For example, the conditional thunk utility may select one function call if a particular dynamic link library (DLL) is resident in the system random access memory (RAM), and select another function call if the particular DLL is not resident in RAM. Thus, in this case, the thunk utility is a precursor operation that determines which function to call based on a dynamic system parameter that may change while the system is running.

The condition-check methodology is implemented using an assembler-level direct-branch technique, and the conditional thunk utility does not utilize the parameter passing utility to queue the arguments of a function call. Thus, the stack is not altered from its desired condition just prior to executing the API function call. For a typical function call, the result is a reduction in the processor burden as a result of using the thunk to X-3 instructions for a function call requiring "X" conditions. The typical direct branch conditional thunk code also includes one third of the lines as compared to the compiled "C-level" conditional thunk function call.

Those skilled in the art will appreciate that the term "stack" commonly refers to the parameter passing utility used by most INTEL microprocessors. There are, however, several other types of parameter passing utilities presently used with other types of microprocessors to support function calls. For example, the parameter passing utility used by most RISC processors (e.g., SPARC processors manufactured by SUN MICROSYSTEMS) is commonly known as a "register set." Accordingly, alternative embodiments of the present invention could equivalently be configured to operate in cooperation with these other types of parameter passing utilities.

Another example of the invention, a jump-table embodiment, may be used for thunk conditions that are invariant, or vary relatively infrequently, while the host computer system is running. This jump-table embodiment involves an assembler-level jump table check followed by a direct jump to a target address. Because the thunk conditions are checked and the jump table is configured in advance, the jump-table embodiment does not require a thunk condition check before each jump. The jump-table is typically configured at start up or upon loading the client program, and may be subsequently refreshed as needed to account for changes in the thunk conditions.

In an exemplary jump-table embodiment, the thunk condition is checked at system start up or when the client program is loaded, and an assembler-level jump table is constructed for the function calls. As this jump table is read as executable code, it is loaded into the instruction cache (I-cache) prior to execution. Thus, the jump, which is configured as a direct branch, does not require the target address for the branch to be loaded indirectly from a pointer from system memory.

The jump-table methodology may be employed to enable the same client program to operate properly with different operating systems. This is because the operating system may vary from computer system to computer system, but does not ordinarily change while the host computer system is running. In a typical application, the conditional thunk layer may select one function call for a first operating system and a second function call for another operating system. Alternatively, the conditional thunk layer may select one set of arguments for a particular function call for a first operating system and another set of arguments for the same function call for a second operating system. Thus, in this case, the thunk layer is a precursor operation that determines which arguments to include in a particular function call.

As a specific example of this class of applications, a conditional thunk layer may conditionally translate the arguments of an API function call to the operating system. In this example, the APIs exposed by the MICROSOFT WINDOWS 95 operating system accept only ANSI (8-bit) arguments, whereas the MICROSOFT WINDOWS NT operating system accepts ANSI (8-bit) or UNICODE (16-bit) arguments. As the UNICODE arguments provide additional information and, thus, offer greater potential for functionality, UNICODE arguments are preferred when available. Accordingly, a conditional thunk layer places the arguments of an API function call in ANSI format if the operating system is MICROSOFT WINDOWS 95, and places the arguments in UNICODE format if the operating system is MICROSOFT WINDOWS NT.

The jump-table conditional thunk utility may also implement a thunk decision based on a component of the host computer system, such as the type of microprocessor included in the system. In this embodiment, the conditional thunk utility may select one function call if the microprocessor is an INTEL PENTIUM processor and another function call if the microprocessor is not an INTEL PENTIUM processor. Thus, in this case, the thunk utility is a precursor operation that determines which function to call based on a component of the host computer system. As the microprocessor of the host computer system does not ordinarily change while the system is running, this type of conditional thunk decision does not change during the operation of the host computer system.

More generally stated, either type of conditional thunk utility (i.e., the condition-check methodology or the jump-table methodology) may be used to implement a thunk decision based on any programmatic decision in which multiple versions of a generally orthogonal function may be called. For example, the thunk utility could select among alternative objects exposing similar interfaces. The thunk decision may be based on a wide variety of conditions, such as the type of printer installed, the settings of a printer or display driver, the type or state of a particular object, the state of user-defined program settings, whether certain program modules are installed or loaded in system memory, the keyboard language being used, and so forth.

The decision of whether to configure a particular conditional thunk using the condition-check methodology or the jump-table methodology should be based on the relative frequency of changes in the thunk condition versus applications of the thunk. For example, if the thunk condition can be expected to vary fifty times for every application of the thunk, it will probably be more efficient to use the condition-check methodology. Conversely, if the thunk can be expected to vary only once for every fifty applications of the thunk, it will probably be more efficient to use the jump-table methodology. Of course, both types of thunk utilities could be included in a particular program module. In this case, thunks involving conditions that change relatively frequently may be implemented using the condition-check methodology, and thunks involving conditions that change relatively infrequently may be implemented using the jump-table methodology.

Exemplary Operating Environment

FIG. 1 and the following discussion are intended to provide a brief, general description of a suitable computing environment in which the invention may be implemented. While the invention will be described in the general context of a desktop publishing software program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, at least one of the application programs 36 includes a fast conditional thunk utility 100 that includes certain embodiments of the invention, which are described below with reference to FIGS. 2A–B, 3, and 4. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are or will be incorporated into the OFFICE 9 and ACCESS 9 application programs sold by Microsoft Corporation on CD-ROM for use with personal computer systems such as the illustrative personal computer 20. The invention may be deployed within, or in connection with, the OFFICE 9 suite of application programs. It will be appreciated that the principles of the invention are not limited to any particular software programs, but could equivalently be applied to any computer-implemented system that involves the use of conditional thunk decisions.

In addition, it is anticipated that the invention may be deployed in connection with future versions of Microsoft's computer software programs. It will be further appreciated that the invention could equivalently be implemented on host computers other than personal computers, and could equivalently be transmitted to the host computer by means other than a CD-ROM, for example, by way of the network connection interface 53.

The Fast Conditional Thunk Utility

Figure 2B:
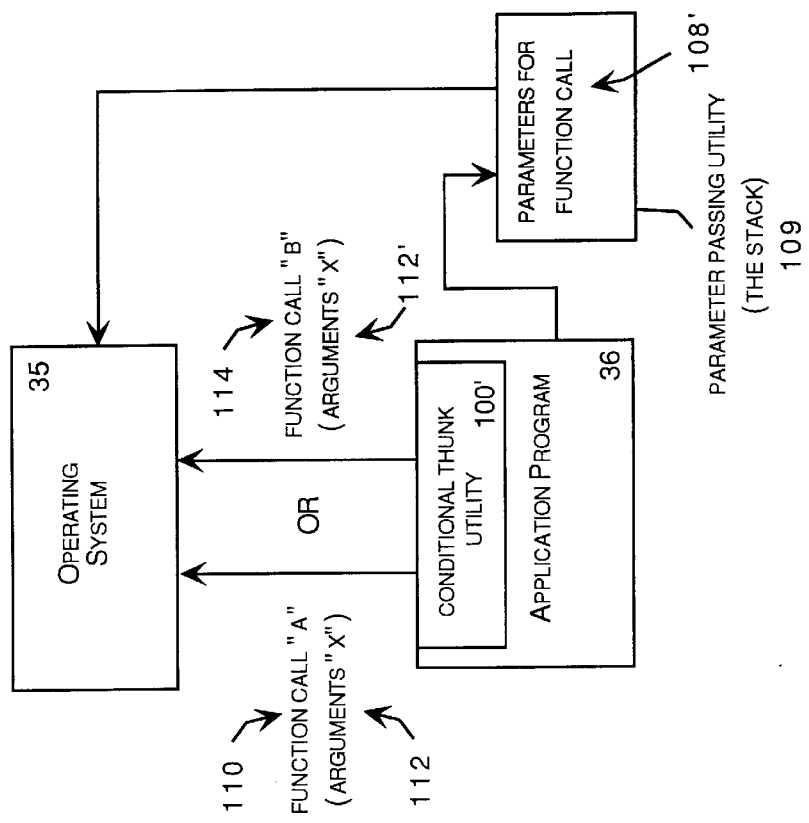
FIG. 2B is a functional block diagram that illustrates a function-selection type conditional thunk utility.
Figure 2A:
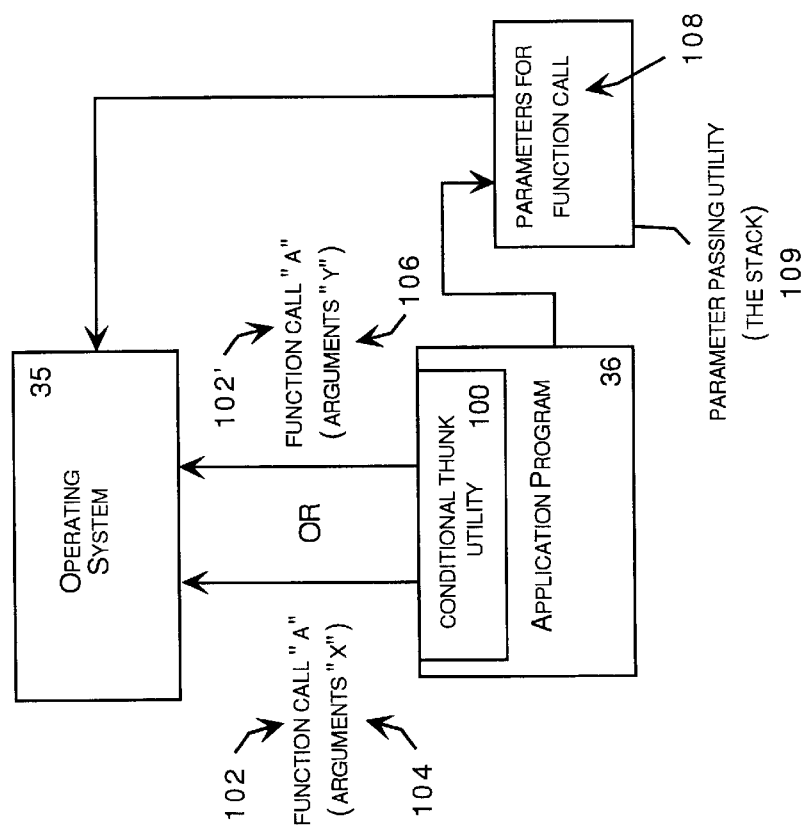
FIG. 2A is a functional block diagram that illustrates an argument-selection type conditional thunk utility.

FIG. 2A is a functional block diagram that illustrates an argument-selection type conditional thunk utility 100. In this example, this conditional thunk utility 100 is configured as part of the application program 36. The conditional thunk utility 100 is employed when the application program 36 accesses an associated API for calling a particular function, shown as function call "A" 102 of the operating system 35. In this argument-selection embodiment, the conditional thunk utility 100 selects one set of arguments, shown as arguments "X" 104, for the function call "A" 102 for a first condition. Alternatively, the conditional thunk utility 100 selects another set of arguments, shown as arguments "Y" 106, for the function call "A" 102' for a second condition. Thus, in this embodiment, the thunk layer is a precursor operation that determines which arguments (arguments "X" 104 or arguments "Y" 106) to include in function call "A" 102 or 102'.

When making the function call "A" 102 or 102', the application program 36 pushes parameters 108 for the function call onto a stack 109. These parameters typically include local variables, addresses, data, or other parameters that the operating system 35 uses when performing the called function. The operating system 35 reads the parameters 108 from the stack 109 before performing the called function. The conditional thunk utility 100 implements an assembler-level direct-branch technique, and does not alter the stack 109 from its desired condition while performing the thunk operation. Therefore, the stack 109 does not have to be altered or cleaned up after the thunk operation and before the operating system 35 reads the parameters 108 from the stack 109.

In a typical application, the conditional thunk utility 100 translates the arguments of the function call "A" 102 based on the type of operating system 35. For example, the APIs exposed by the MICROSOFT WINDOWS 95 operating system accept only ANSI (8-bit) arguments, whereas the MICROSOFT WINDOWS NT operating system accepts ANSI (8-bit) or UNICODE (16-bit) arguments. As the UNICODE arguments provide additional information and, thus, offer greater potential for functionality, UNICODE arguments are preferred when available. Accordingly, the conditional thunk utility 100 places the arguments "X" 104 in ANSI format if the operating system 35 is MICROSOFT WINDOWS 95, and places the arguments "Y" 106 in UNICODE format if the operating system is MICROSOFT WINDOWS NT.

FIG. 2B is a functional block diagram that illustrates a function-selection type conditional thunk utility 100'. In this embodiment, the conditional thunk utility 100' selects one function call "A" 110, shown using arguments "X" 112, for a first condition. Alternatively, the conditional thunk utility 100' selects another function call "B" 114, also shown using arguments "X" 112, for a second condition. Thus, in this embodiment, the thunk layer is a precursor operation that determines which function to call, function call 110 or function call 114, both using the same arguments "X" 112. When making the function call "A" 110, the application program 36 pushes parameters 108' for the function call onto a stack 109. The operating system 35 reads the parameters 108' from the stack 109 before performing the called function.

In a typical application, the conditional thunk utility 100' may implement a thunk decision based on a component of the host computer system, such as the type of microprocessor included in the system. For example, the conditional thunk utility 100' may select one function call if the processor is an INTEL PENTIUM processor and another function call if the processor is not an INTEL PENTIUM processor. Thus, in this function-selection embodiment, the thunk utility is a precursor operation that determines which function to call based on a component of the host computer system. As the microprocessor of the host computer system does not ordinarily change while the system is running, this type of conditional thunk decision does not change during the operation of the host computer system.

Referring to FIGS. 2A and 2B, either conditional thunk utility 100 or 100' may implement a thunk decision based on a condition of the operating system that can change while the host computer system is running. For example, the conditional thunk layer may select one function call if a particular dynamic link library (DLL) is resident in the system RAM, and another function call if the particular DLL is not resident in RAM. In this embodiment, the thunk utility is a precursor operation that determines which function to call based on a dynamic system parameter that may change while the system is running.

Figure 3:
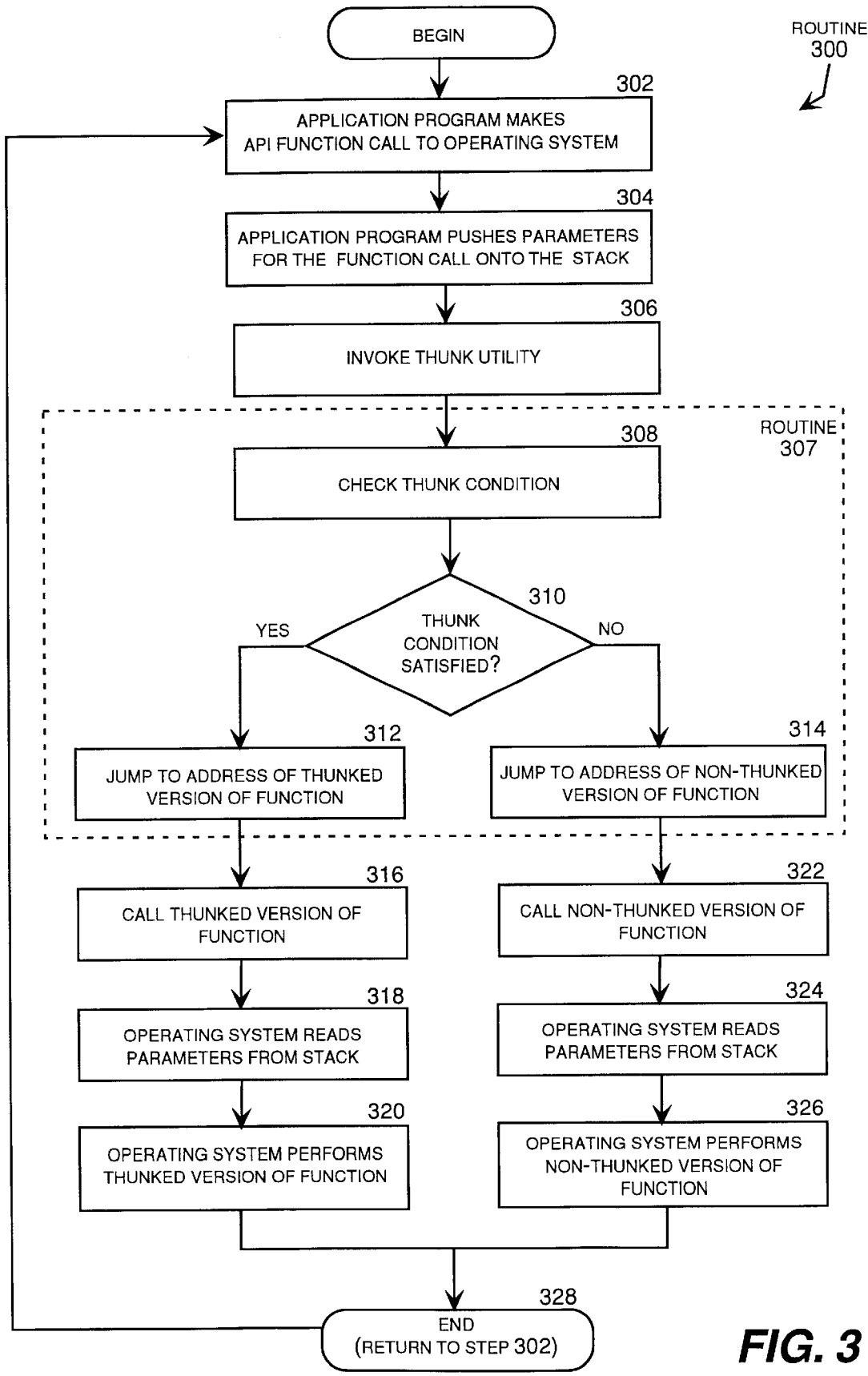
FIG. 3 is a logic flow diagram illustrating a condition-check method for implementing a conditional thunk utility.

FIG. 3 is a logic flow diagram illustrating a condition-check routine 300 for implementing a conditional thunk utility. In this example, the client program containing the conditional thunk utility 100 is the application program 36, and the thunk decision is a precursor operation related to an API function call to the operating system 35. Routine 300 begins at step 302, in which the application program 36 makes an API function call to the operating system 35. Step 302 is followed by step 304, in which the application program 36 pushes parameters for the function call onto the stack. Step 304 is followed by step 306, in which the application program 36 invokes the conditional thunk utility 100, which performs routine 307. Routine 307 includes steps 308, 310, 312, and 314 described below.

In step 308, the conditional thunk utility 100 checks the thunk condition. The thunk condition may be any of a variety of conditions, such as the state of a dynamic system parameter (e.g., whether a particular DLL is resident in system RAM), the type of operating system 35 (e.g., MICROSOFT WINDOWS 95 or MICROSOFT WINDOWS NT), the type of a particular system component (e.g., type of processor), and the like. In step 310, the conditional thunk utility 100 determines whether the thunk condition is satisfied. If the thunk condition is satisfied, the "YES" branch is followed to step 312, in which the conditional thunk utility 100 jumps to the address of the thunked version of the API function called in step 302. If the thunk condition is not satisfied, the "NO" branch is followed to step 314, in which the conditional thunk utility 100 jumps to the address of the non-thunked version of the API function called in step 302.

Step 312 is followed by step 316, in which the application program 36 calls the thunked version of the API function called in step 302. Step 316 is followed by step 318, in which the operating system 35 reads the parameters that were pushed onto the stack by the application program 36 in step 304. Step 318 is followed by step 320, in which the operating system 35 performs the thunked version of the API function using the parameters retrieved from the stack in step 318.

Similarly, step 314 is followed by step 322, in which the application program 36 calls the non-thunked version of the API function called in step 302. Step 322 is followed by step 324, in which the operating system 35 reads the parameters that were pushed onto the stack by the application program 36 in step 304. Step 324 is followed by step 326, in which the operating system 35 performs the non-thunked version of the API function using the parameters retrieved from the stack in step 324. Steps 320 and 326 are followed by the "END" step 328, which typically returns to step 302, in which the application program 36 may make another API function call to the operating system 35.

Thus, the routine 300 performs a condition check (steps 308 and 310) followed by a conditional jump (steps 312 or 314) for each API function call. For this reason, routine 300 is useful in situations in which the thunk condition can vary relatively frequently while the application program 36 and the operating system 35 are running. For example, routine 300 may be used when the thunk condition is the state of a dynamic system parameter, such as whether a particular DLL is resident in system RAM.

The following is an example of the code required for an illustrative condition-check routine 307 for implementing a conditional thunk utility 100. This particular conditional thunk utility performs the thunk of changing a UNICODE argument to an ANSI argument if the operating system is MICROSOFT WINDOWS 95.

```
cmp windows95,0    ; Check the conditional thunk condition
jne X_thunked      ; Perform the thunk
jmp X_UNICODE      ; No thunk needed
```

Figure 4:
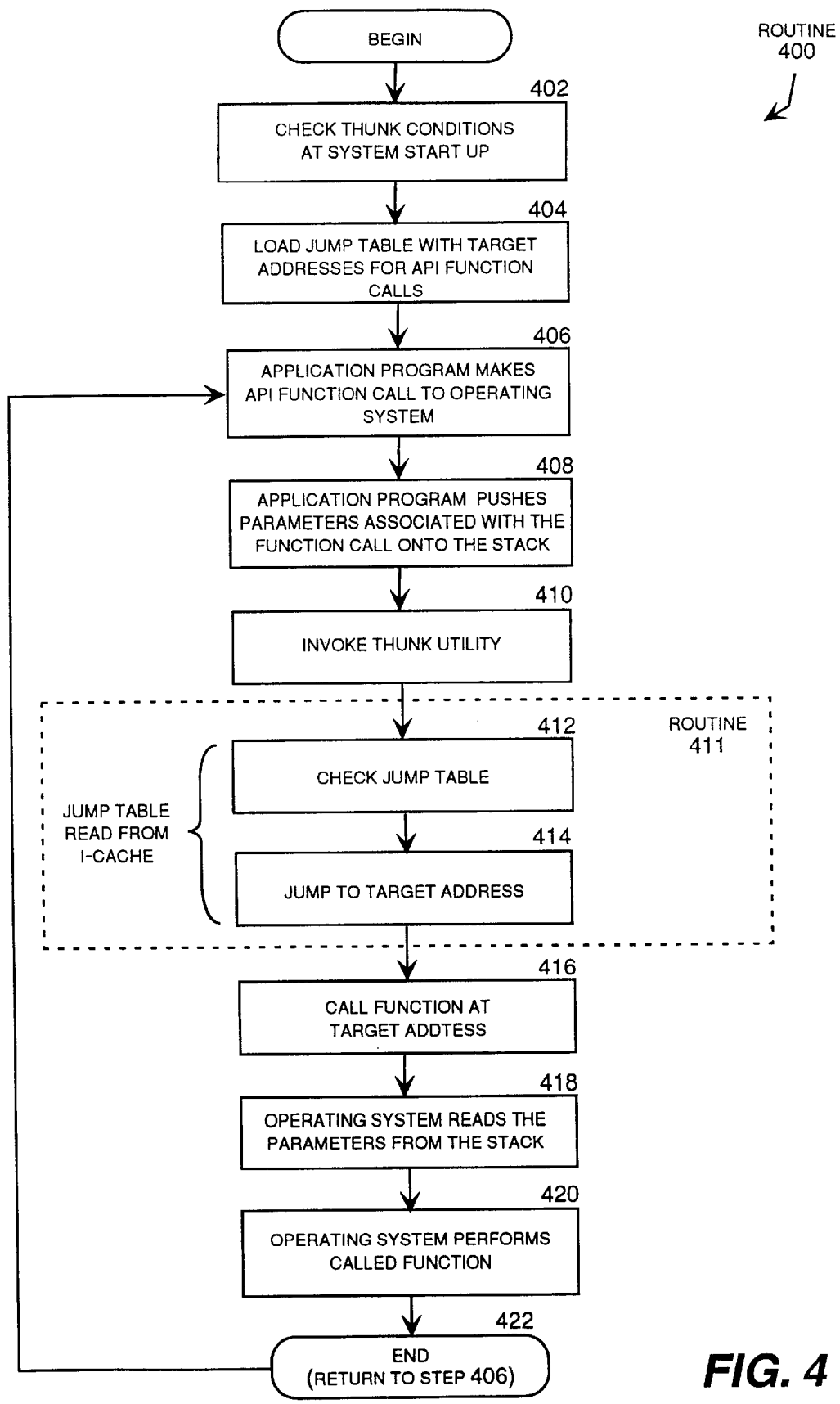
FIG. 4 is a logic flow diagram illustrating a jump-table method for implementing a conditional thunk utility.

FIG. 4 is a logic flow diagram illustrating a jump-table routine 400 for implementing a conditional thunk utility. Again in this example, the client program containing the conditional thunk utility 100 is the application program 36, and the thunk decision is a precursor operation related to an API function call to the operating system 35. Routine 400 begins at step 402, in which the application program 36 at system start up checks the thunk conditions for the various API function calls that the application program is configured to access. The thunk conditions may alternatively be checked upon loading the application program 36, or upon the occurrence of an event indicating a need to refresh the jump table, such as a change in a thunk condition. Step 402 is followed by step 404, in which the application program 36 loads a jump table with a target address for each of the API function calls.

The jump table stores target addresses for the thunked or the non-thunked versions of an API function call, as appropriate. For a particular API function call, the jump table indicates the starting address of the thunked or non-thunked version of the function depending on the result of the thunk condition check for that particular function. That is, the jump table points to the starting address of the thunked version of the API function call if the thunk condition for that function is satisfied. Conversely, the jump table points to the starting address of the non-thunked version of the API function call if the thunk condition for that function is not satisfied.

Step 404 is followed by step 406, in which the application program 36 makes an API function call to the operating system 35. Step 406 is followed by step 408, in which the application program 36 pushes parameters for the function call onto the stack. Step 408 is followed by step 410, in which the application program 36 invokes the conditional thunk utility 100, which performs routine 411. Routine 411 includes steps 412 and 414. In step 412, the conditional thunk utility 100 checks the thunk jump table for the API function called in step 406. Step 412 is followed by step 414, in which the conditional thunk utility 100 jumps to the target address included in the jump table for the API function call.

Step 414 is followed by step 416, in which the application program 36 calls the API function located at the target address. Step 416 is followed by step 418, in which the operating system 35 reads the parameters that were pushed onto the stack by the application program 36 in step 408. Step 418 is followed by step 420, in which the operating system 35 performs the called function. Step 420 is followed by the "END" step 422, which typically returns to step 406, in which the application program 36 may make another API function call to the operating system 35.

Thus, routine 400 performs a jump-table check (step 412) followed by a direct jump (step 414) for each API function call. Unlike routine 300, routine 400 does not perform a condition check for each API function call. For this reason, routine 400 is typically used in situations in which the thunk conditions are invariant, or vary relatively infrequently, while the application program 36 and the operating system 35 are running. For example, routine 400 may be used when the thunk decision is based on the type of operating system 35 (e.g., MICROSOFT WINDOWS 95 or MICROSOFT WINDOWS NT), or the type of a particular system component (e.g., type of processor) in the host computer system.

The following is an example of the code required for a jump-table routine 410 for implementing a conditional thunk utility 100. This conditional thunk utility also performs the thunk of changing a UNICODE argument to an ANSI argument if the operating system is MICROSOFT WINDOWS 95.

| Sample Table | |
|---|---|
| :x_table_entry;<br>jmp X_UNICODE | (":x_table_entry" denotes an address label) |
| :y_table_entry<br>jmp Y_UNICODE | (":y_table_entry" denotes an address label) |
| :z_table_entry<br>jmp Z_UNICODE | (":z_table_entry" denotes an address label) |
| . . .<br>jmp x_table_entry; | Sample code to call the table. |

In view of the foregoing, it will be appreciated that the invention provides a conditional thunk utility that avoids duplicative stack manipulation, such as that produced by using a "C-level" function call to implement a conditional thunk routine. The invention also provides a conditional thunk utility that avoids an indirect branch, such as a reference to an address in a look-up table stored in system memory, to determine the target address of a conditional thunk routine. It should be understood that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions for performing the steps of:
   checking a plurality of thunk conditions to obtain a thunk condition result for each of a plurality of functions;
   loading an assembler-level jump table with a target address for each function, the value of the target address for each function depending on the thunk condition result for that function;
   generating a function call associated with a conditionally thunked function;
   pushing parameters associated with the function call onto a parameter passing utility associated with a computer system;
   without altering the condition of the parameter passing utility, invoking an assembler-level direct-branch conditional thunk utility configured for selecting a version of the function based on a condition of the computer system;
   calling the selected version of the function;
   reading the parameters from the parameter passing utility; and
   performing the selected version of the function using the parameters read from the parameter passing utility.

2. The computer-readable medium of claim 1, wherein the step of selecting a version of the function based on a condition of the computer system comprises the steps of:
   obtaining a target address associated with the function from an assembler-level jump table; and
   jumping to the target address.

3. The computer-readable medium of claim 2, before the step of generating a function call, further comprising the steps of:
   checking a plurality of thunk conditions to obtain a thunk condition result for each of a plurality of functions; and loading an assembler-level jump table with a target address for each function, the value of the target address for each function depending on the thunk condition result for that function.

4. The computer-readable medium of claim 2, wherein the jump table is read from an instruction cache memory associated with the computer system.

5. The computer-readable medium of claim 4, wherein the step of checking a thunk condition comprises determining whether the computer system includes a predefined type of processor.

6. The computer-readable medium of claim 4, wherein the step of checking a thunk condition comprises a determination selected from the group including:

whether a predefined dynamic link library is resident in a random access memory component of the computer system;

whether a predefined type of operating system is running on the computer system;

whether a predefined type of printer is coupled to the computer system;

whether a predefined keyboard language is being used within the computer system;

a setting associated with a printer driver within to the computer system;

a setting associated with a display driver within the computer system;

a state associated with an object within the computer system; and a state associated with a user-defined program setting.

7. A method for processing a function call from a client program to a host program running on a computer system, comprising the steps of:

checking a plurality of thunk conditions to obtain a thunk condition result for each of a plurality of functions;

loading an assembler-level jump table with a target address for each function, the value of the target address for each function depending on the thunk condition result for that function;

generating a function call associated with a conditionally thunked function;

pushing parameters associated with the function call onto a parameter passing utility associated with a computer system;

without altering the condition of the parameter passing utility, invoking an assembler-level direct-branch conditional thunk utility configured for jumping to a previously-selected version of the function based on a condition of the computer system by,
obtaining a target address associated with the function from an assembler-level jump table, and
jumping to the target address;

calling the previously-selected version of the function;

reading the parameters from the parameter passing utility; and performing the selected version of the function using the parameters read from the parameter passing utility.

8. A computer-readable medium having computer-executable instructions for performing the steps of:

checking a plurality of thunk conditions to obtain a thunk condition result for each of a plurality of conditionally thunked functions, and loading an assembler-level jump table with a target address for each function, the value of the target address depending on the thunk condition result the associated function;

generating a function call associated with one of the functions;

pushing parameters associated with the function call onto a parameter passing utility;

without altering the condition of the parameter passing utility, invoking an assembler-level direct-branch conditional thunk utility configured for jumping to a previously-selected version of the function based on a condition of a computer system by,
obtaining a target address associated with the function from an assembler-level jump table, and
jumping to the target address;

calling the previously-selected version of the function located at the target address;

reading the parameters from the parameter passing utility; and performing the selected version of the function using the parameters read from the parameter passing utility.

9. The computer-readable medium of claim 8, wherein the step of obtaining the target address comprises the step of reading the jump table from an instruction cache memory associated with the computer system.

10. The computer-readable medium of claim 9, wherein the step of checking a thunk condition comprises determining whether the computer system includes a predefined type of processor.

11. The computer-readable medium of claim 9, wherein the step of checking a thunk condition comprises a determination selected from the group including:

whether a predefined dynamic link library is resident in a random access memory component of the computer system;

whether a predefined type of operating system is running on the computer system;

whether a predefined type of printer is coupled to the computer system;

whether a predefined keyboard language is being used within the computer system;

a setting associated with a printer driver within to the computer system;

a setting associated with a display driver within the computer system;

a state associated with an object within the computer system; and a state associated with a user-defined program setting.

* * * * *

UNITED STATES PATENT AND TRADEMARK OFFICE
CERTIFICATE OF CORRECTION

PATENT NO.    : 6,553,429 B1
DATED         : April 22, 2003
INVENTOR(S)   : Wentz et al.

It is certified that error appears in the above-identified patent and that said Letters Patent is hereby corrected as shown below:

Column 14,
Line 9, "result the" should read -- result for the --
Line 51, "within to the" should read -- within the --

Signed and Sealed this

Thirtieth Day of December, 2003

JAMES E. ROGAN
*Director of the United States Patent and Trademark Office*